A. J. Robison.
Dirt Scraper.
No. 23,610.        Patented Apr. 12, 1859.
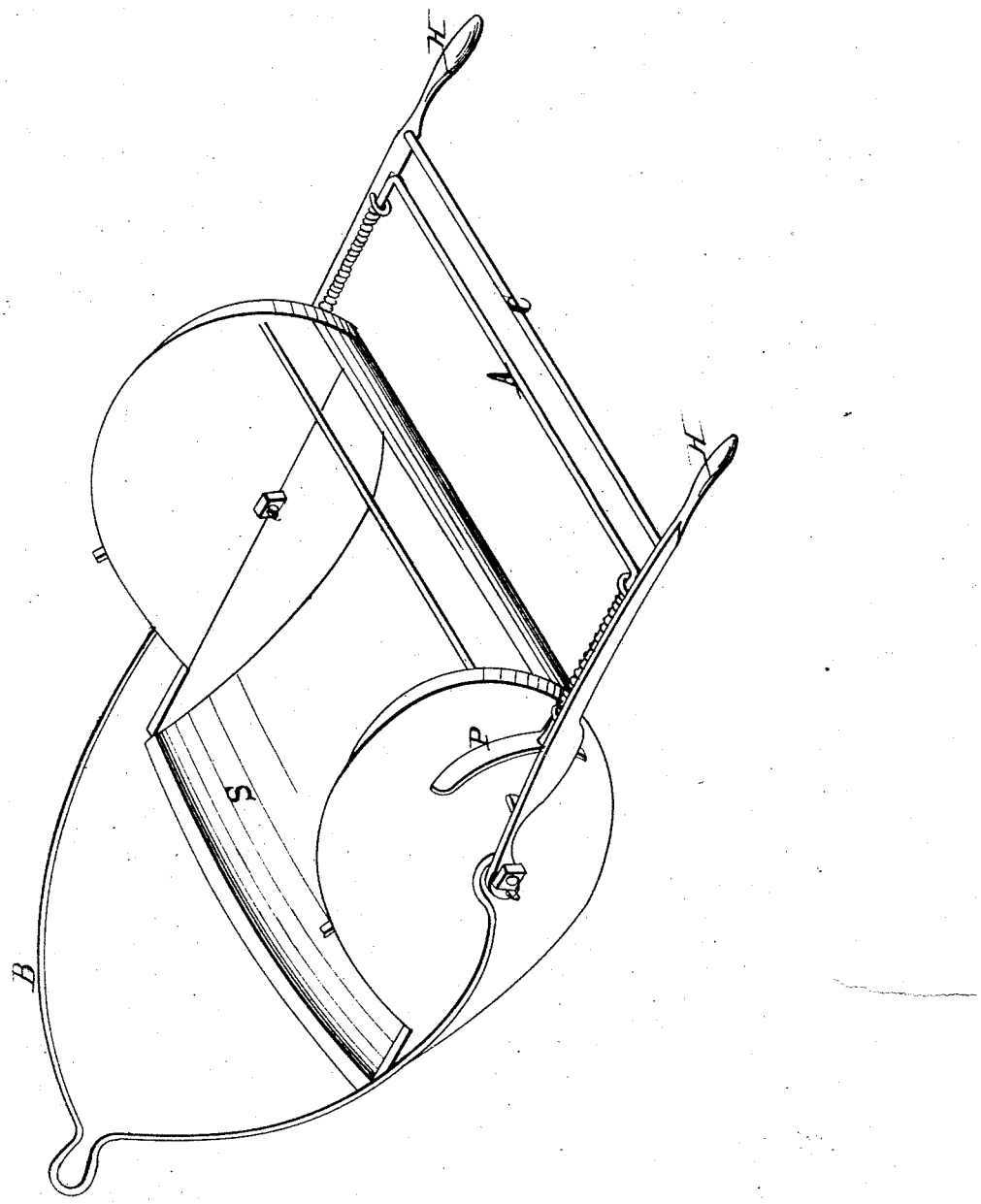

UNITED STATES PATENT OFFICE.

A. J. ROBISON, OF GYPSUM, NEW YORK.

DIRT-SCRAPER.

Specification of Letters Patent No. 23,610, dated April 12, 1859.

*To all whom it may concern:*

Be it known that I, A. J. ROBISON, of Gypsum, in the county of Ontario and State of New York, have made and invented certain new and useful Improvements in Dirt-Scrapers, of which the following is a full and accurate description, reference being had to the accompanying drawings, making part of this specification, in which my improved scraper is shown in perspective.

The nature of this invention consists in an improved means of emptying or unloading the scraper after it has been filled in the usual manner and will be best understood from a description of the machine.

In the drawing S is the scraper with sides as usual to retain the dirt.

B is the bail to which the draft is applied and H H are the handles for guiding the whole. These handles are firmly connected by means of the cross-bar C and they both revolve on the center e. At each side of the scraper is the projection P which is curved with considerable eccentricity in relation to the center e—the point P being nearest to said center. A is another cross-bar which is bent at right angles as seen in the drawing. These bent ends slide through eyes attached to the handles H H and are pressed toward the center e by coiled springs—all which will be at once perceived on inspecting the drawing.

In the projections P are holes to receive the bent ends of A so that when these ends are in said holes the handles H H are immovable on the center. The machine may then be used as the common scraper. But when it is desired to empty the dirt both ends of the bar A are withdrawn from the holes in the projection P and then the whole scraper will turn over and deposit the dirt in a heap as the bail or draft is attached to the sides at e which is considerably above and behind the edge of the scraper.

The cross-bar A being now released will be impelled toward the center e by the coiled springs. The projection P being cam shaped as before described will press it back—sliding over the ends of said cross bar until the holes in P come opposite to said ends of cross bar A when the scraper will be prevented from revolving further by the ends of A falling into these holes.

The advantages to be derived from these improvements are sufficiently obvious. The ease and convenience of working and rapidity of execution are greatly increased and the whole machine is simple and not liable to get out of repair.

I am aware that dirt scrapers have been made so as to empty themselves by rotating or turning over and therefore this I do not claim. But What I do claim is—

The combination of the cam-plate P with teh spring bar A for consecutively releasing and retaining the scraper in position as shown, the whole being arranged in the manner and for the purpose substantially as described.

A. J. ROBISON.

Witnesses:
 WM. J. VANDUSEN,
 L. S. ROBISON.